(12) United States Patent
Rozman et al.

(10) Patent No.: US 7,619,327 B2
(45) Date of Patent: Nov. 17, 2009

(54) HYBRID ELECTROMECHANICAL POWER TRANSFER SYSTEM

(75) Inventors: Gregory I Rozman, Rockford, IL (US); Vijay K Maddali, Rockford, IL (US); Vietson M Nguyen, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 391 days.

(21) Appl. No.: 11/825,451

(22) Filed: Jul. 6, 2007

(65) Prior Publication Data

US 2009/0008993 A1 Jan. 8, 2009

(51) Int. Cl.
*H02J 3/46* (2006.01)
(52) U.S. Cl. ...................................... 307/153
(58) Field of Classification Search ............... 307/153
See application file for complete search history.

(56) References Cited

U.S. PATENT DOCUMENTS

| | | |
|---|---|---|
| 5,233,286 A | 8/1993 | Rozman et al. |
| 5,493,200 A | 2/1996 | Rozman et al. |
| 2002/0089864 A1 | 7/2002 | Kalman et al. |
| 2005/0099829 A1 | 5/2005 | Wei et al. |

OTHER PUBLICATIONS

U.S. Appl. No. 10/996,511, Kevin Dooley.
U.S. Appl. No. 11/420,614, Kevin Dooley.

*Primary Examiner*—Robert L. Deberadinis
(74) *Attorney, Agent, or Firm*—Stephen G. Mican

(57) ABSTRACT

An electromechanical power transfer system that transfers power between a prime mover and a combination of multiphase alternating current (AC) and direct current (DC) electrical power systems, comprises: a dynamoelectric machine that has a rotor assembly coupled to the prime mover, a main stator with a multiphase alternating current (AC) winding coupled to a main stator bus and a control coil with a winding that varies the output of the main stator with the application of control coil current; a matrix converter coupled to the main stator bus for converting AC on the main stator bus to AC of a desired electrical frequency and potential on an AC system bus; an active rectifier coupled to the main stator bus for converting AC on the main stator bus to DC of a desired potential on a DC bus; and a system control unit for generating the control coil current with a level that regulates the output of the main stator on the main stator bus, controlling the output of the matrix converter to regulate the output of the AC system bus and controlling the output of the active rectifier to regulate the output of the DC bus.

13 Claims, 6 Drawing Sheets

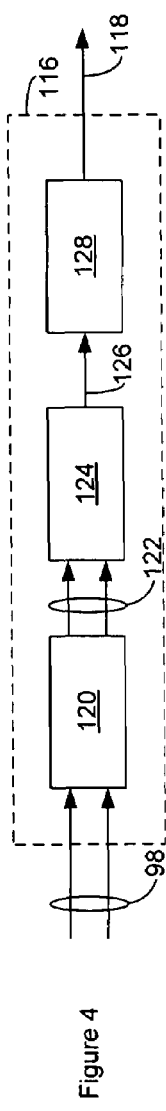
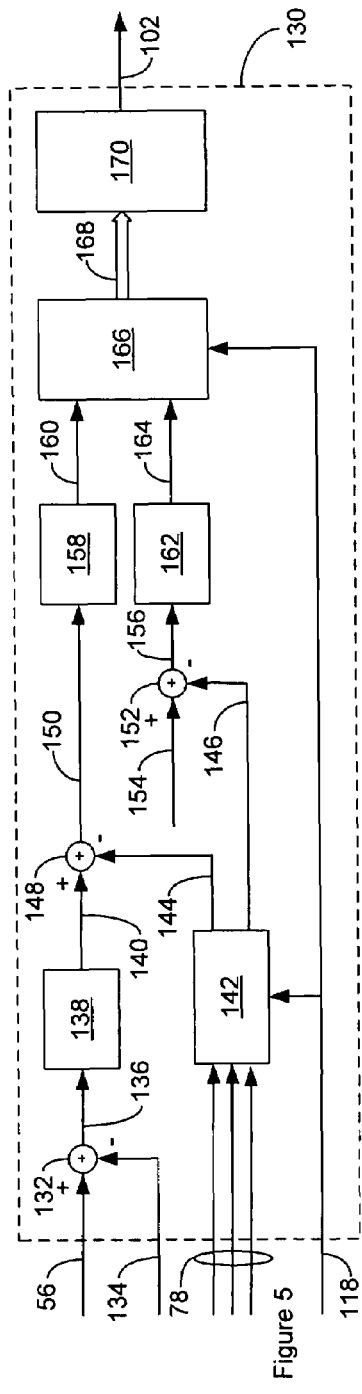
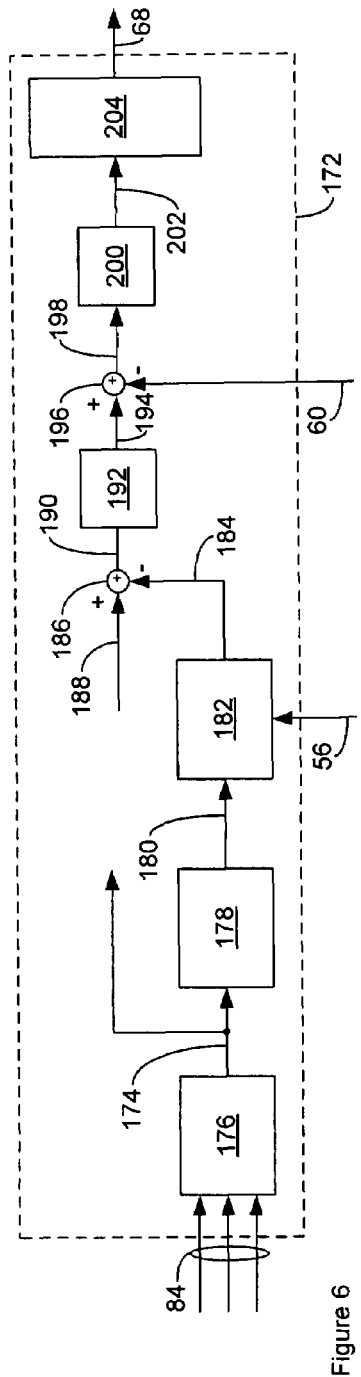
Figure 4
Figure 5
Figure 6

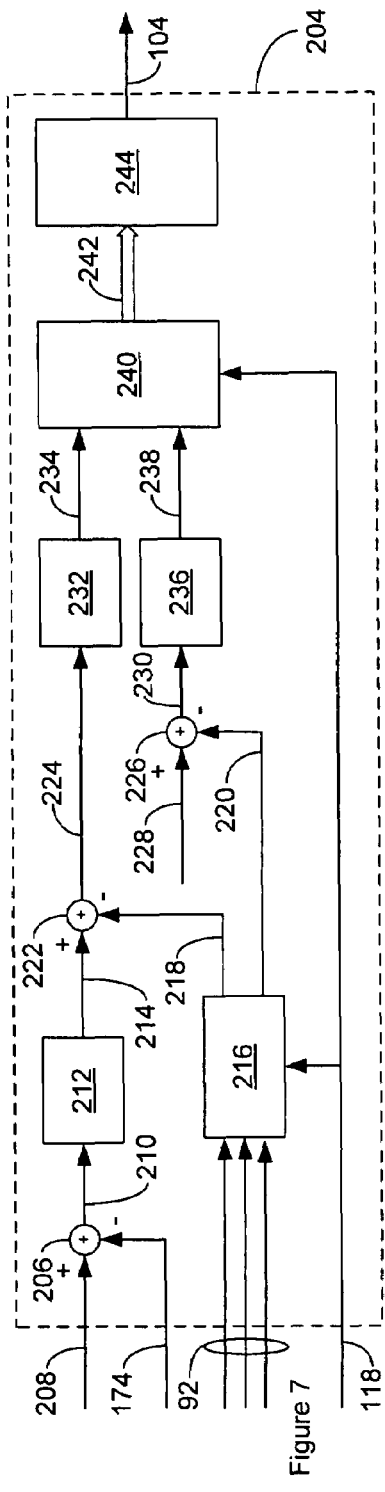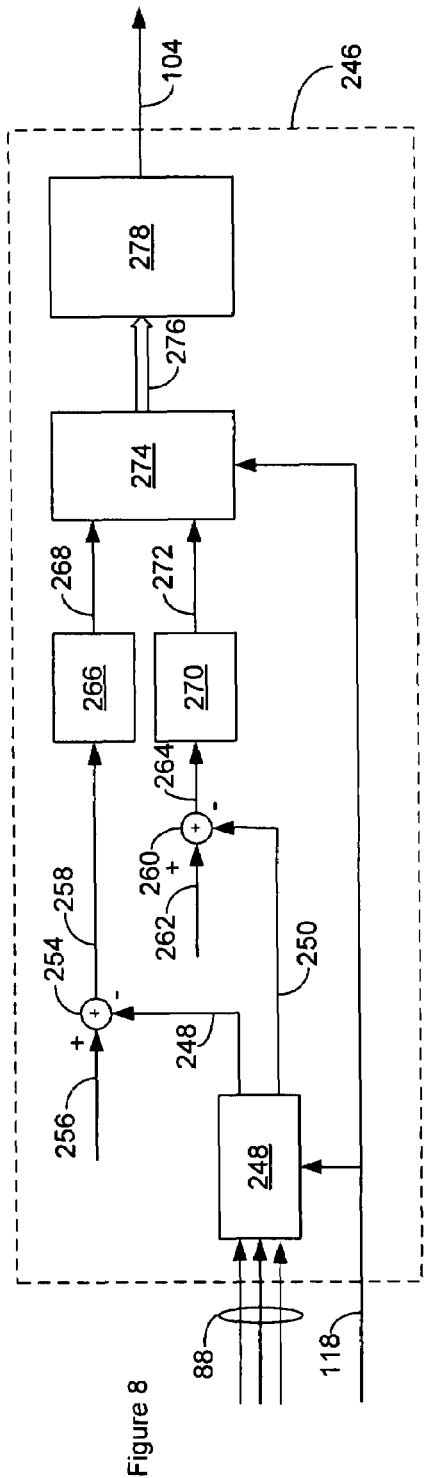
Figure 7
Figure 8

HYBRID ELECTROMECHANICAL POWER TRANSFER SYSTEM

FIELD OF THE INVENTION

The invention relates to electromechanical power transfer systems for electrical power generation, and more particularly to such systems that employ a prime mover to generate both alternating current (AC) and direct current (DC) electrical power.

BACKGROUND OF THE INVENTION

An electromechanical power transfer system of the hybrid type, wherein a prime mover such as a gas turbine engine simultaneously generates AC and DC type electrical power, is particularly useful for aeronautical applications. Such applications generally require 230 V 400 Hz three phase AC as well as positive and negative 270 V DC.

In aeronautical applications, electromechanical power transfer systems convert power from variable speed prime movers, generally of the gas turbine type, to electrical power for electrical that require a high degree of regulation. Such power transfer systems usually convert mechanical power from the prime mover to electrical power by way of a brushless dynamoelectric machine, such as a wound field synchronous machine (WFSM) that has the ability to regulate its electrical output when integrated with a suitable system controller. Alternatively, regulated permanent magnet machines that are also capable of developing a highly regulated power output are becoming available for this purpose. Such dynamoelectric machines inherently generate multiphase AC power, generally of the three-phase type.

Hybrid electromechanical power transfer systems according to the prior art generally employ a three-phase rectifier that converts AC generated by the dynamoelectric machine to DC that it couples to a DC bus and a three-phase pulse width modulated (PWM) inverter. These systems require a large size DC link capacitor to decouple generator variable frequency AC power and constant frequency inverter output AC power. It is possible to generate variable frequency AC power with two back-to-back converters to eliminate a bulky DC link capacitor.

Using a high-speed brushless dynamoelectric machine for electrical power generation results in reduced size and weight of the dynamoelectric machine. In some cases, high-speed dynamoelectric machines may directly couple to a prime mover, such as a gas turbine engine, thereby eliminating a reduction gearbox that results in further reduction of size, cost and weight of total electromechanical power transfer system. Using a generator with a high number of poles and increased operating speed enables generation of a high frequency output of 4,000 Hz or more. An AC bus for such high frequency AC power is not suitable for power distribution in an aircraft due to EMI constraints and requirements. However, it may be attractive in a combination with matrix converter topologies that eliminate bulky DC bus capacitors resulting in reduction of size and cost for power electronics.

SUMMARY OF THE INVENTION

The invention generally comprises an electromechanical power transfer system that transfers power between a prime mover and a combination of multiphase alternating current (AC) and direct current (DC) electrical power systems, comprising: a dynamoelectric machine that has a rotor assembly coupled to the prime mover, a main stator with a multiphase alternating current (AC) winding coupled to a main stator bus and a control coil with a winding that varies the output of the main stator with the application of control coil current; a matrix converter coupled to the main stator bus for converting AC on the main stator bus to AC of a desired electrical frequency and potential on an AC system bus; an active rectifier coupled to the main stator bus for converting AC on the main stator bus to DC of a desired potential on a DC bus; and a system control unit for generating the control coil current with a level that regulates the output of the main stator on the main stator bus, controlling the output of the matrix converter to regulate the output of the AC system bus and controlling the output of the active rectifier to regulate the output of the DC bus.

DESCRIPTION OF THE DRAWINGS

FIG. 4 is a detailed schematic diagram of a synchronisation derivation system for the system control unit shown in FIG. 3.

FIG. 5 shows a detailed schematic of a DC bus active rectifier controller for the system control unit shown in FIG. 3.

FIG. 6 is a detailed schematic diagram of an exciter stator controller for the system control unit shown in FIG. 3.

FIG. 7 shows a detailed schematic of a source-side matrix converter controller for the system control unit shown in FIG. 3.

FIG. 8 shows a more detailed schematic of a load-side matrix converter controller for the system control unit shown in FIG. 3.

DETAILED DESCRIPTION OF THE INVENTION

Figure 1:
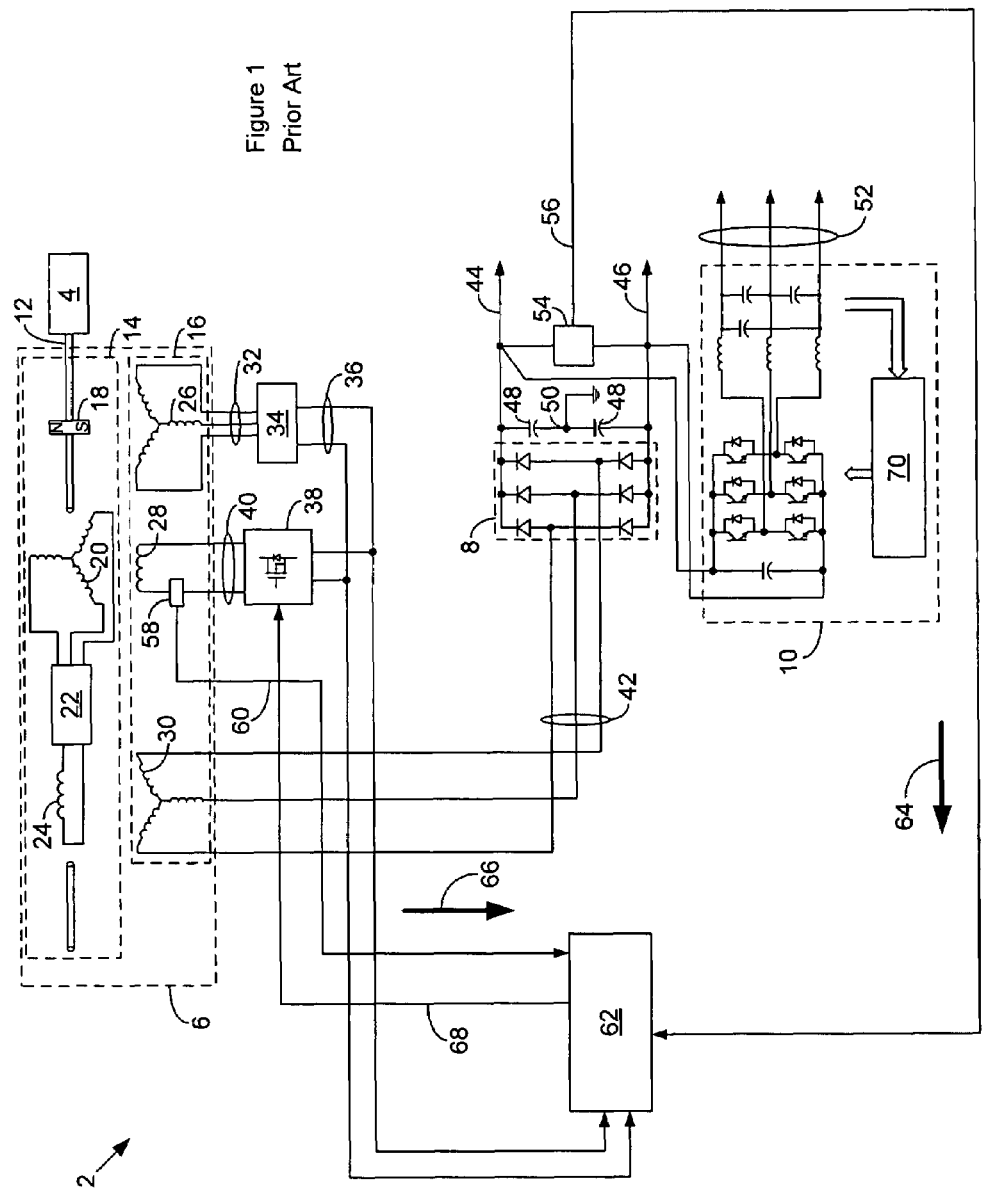
FIG. 1 is a high-level schematic diagram of an electromechanical power transfer system according to the prior art that utilises a dynamoelectric machine of the wound field synchronous type, a rectifier and a PWM inverter.

FIG. 1 is a high-level schematic diagram of an electromechanical power transfer system 2 according to the prior art that utilises a prime mover 4, a dynamoelectric machine 6 of the wound field synchronous type, a rectifier 8 and a PWM inverter 10. The prime mover 4 directly couples to the machine 6 by way of a drive shaft 12. The machine 6 comprises a permanent magnet (PM) rotor assembly 14 and a multiphase stator assembly 16.

The rotor assembly 14 couples to the prime mover 4 by way of the drive shaft 12. The rotor assembly 14 comprises an auxiliary permanent magnet (PM) rotor 18, a multiphase AC exciter rotor winding 20, a rotating rectifier assembly 22 and a main DC rotor winding 24, all coupled to the drive shaft 12. The multiphase stator assembly 16 comprises an auxiliary multiphase AC stator winding 26 proximate the PM rotor 18, a DC exciter stator winding 28 proximate the exciter rotor winding 20 and a multiphase main stator winding 30 proximate the main rotor winding 24.

As the prime mover 4 rotates, it rotates the rotor assembly 16 by way of the drive shaft 12. As a result, the auxiliary PM rotor 18 generates a rotating magnetic field. Lines of flux from the PM rotor 18 magnetic field cut through the auxiliary stator winding 26, thereby generating multiphase AC auxiliary power on an auxiliary AC power bus 32 coupled to the auxiliary stator winding 26. An auxiliary power rectifier assembly 34 receives the AC auxiliary power on the auxiliary AC power bus 32 and converts it to auxiliary DC power on a DC control power bus 36. An H-bridge 38 receives DC power from the DC control power bus 36 and supplies DC exciter power on an exciter power bus 40.

The exciter stator winding 28 receives the exciter power on the exciter power bus 40 to develop an exciter magnetic field. The exciter rotor winding 20 cuts lines of flux of the exciter magnetic field as the rotor assembly 14 rotates to develop a multiphase AC exciter current. The rotating rectifier assembly 22 receives the AC exciter current and converts it to DC rotating rectifier output current. The main rotor winding 24 receives the DC rotating rectifier output current to develop a main rotor magnetic field. The main stator winding 30 cuts lines of flux of the main rotor magnetic field as the rotor assembly 14 rotates to develop multiphase AC main power on a main stator bus 42.

The rectifier 8 receives the multiphase AC main power on a main stator bus 42 to generate positive DC power on a positive DC rail 44 and negative DC power on a negative DC rail 46. Series connected DC link capacitors 48 connected across the positive DC rail 44 and the negative DC rail 46 with a mid-point connection 50 to ground filter the positive and negative DC power as well as establish equal and opposite electrical potential with respect to ground. The PWM inverter 10 receives the positive DC power on the positive DC rail 44 and the negative DC power on a negative DC rail 46 to generate multiphase AC system bus power on an AC system bus 52.

A DC electrical potential sensor 54 senses the electrical potential across the positive DC rail 44 and the negative DC rail 46 to generate a corresponding DC bus potential signal on a DC bus potential sensor output line 56. An exciter current sensor 58 senses the level of exciter current passing through the exciter power bus 40 to generate a corresponding exciter current signal on an exciter current sensor output line 60. A system control unit 62, powered by the control power bus 36, generates H-bridge drive signals on an H-bridge drive signal bus 68 and the H bridge 38 receives the H-bridge drive signals to adjust the level of the exciter current on the exciter bus 40 that corresponds to the exciter control signal.

The system control unit 62 receives the DC bus potential signal on the DC bus potential sensor output line 56 in a DC bus potential feedback loop 64 and compares its level to a reference DC level. The system control unit 62 also receives the exciter current signal on the exciter current sensor output line 60 in an exciter current feedback loop 66. The system control unit 62 determines any difference between the DC bus potential signal and the reference DC level, determines the level of the exciter current signal and adjusts the level of the exciter control signal to maintain the positive DC potential on the positive DC rail 44 and the negative DC potential on the negative DC rail 46 at a constant reference level.

The PWM inverter 10 has an inverter control unit 70 that monitors the level of electrical potential for the multiphase AC system bus power on the AC system bus 52. It adjusts the modulation of the PWM inverter 10 to maintain a constant reference level of electrical potential.

Figure 2:
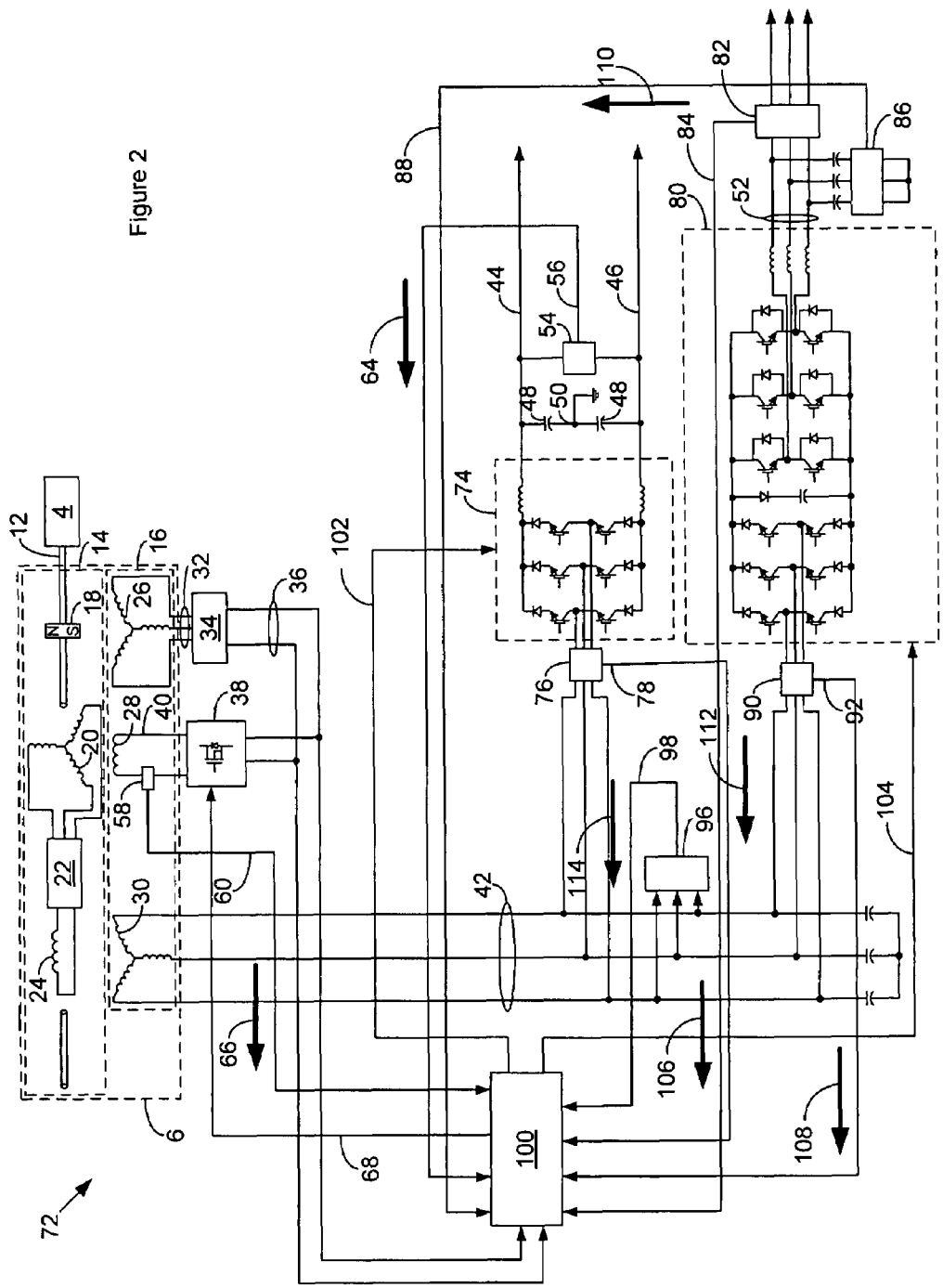
FIG. 2 is a high-level schematic diagram of an electromechanical power transfer system according to a possible embodiment of the invention that utilises a dynamoelectric machine of the wound field synchronous type.

FIG. 2 is a high-level schematic diagram of an electromechanical power transfer system 72 according to a possible embodiment of the invention that utilises a dynamoelectric machine of the wound field synchronous type. It is similar to the electromechanical power transfer system 2 described above in the way that the dynamoelectric machine 6 generates multiphase AC main power on the main stator bus 42. However, wherein the electromechanical power transfer system 2 generally comprises a three-phase AC system that generates AC main power within a 300-800 Hz frequency range, the electromechanical power transfer system may generate multiphase AC main power on the main stator bus with a much higher frequency, such as 4 kHz or more. This greatly reduces the size, weight and cost of the dynamoelectric machine 6.

An active rectifier 74 receives the multiphase AC main power on the main stator bus 42 and converts it to the positive DC power on the positive DC rail 44 and the negative DC power on the negative DC rail 46. The series connected DC link capacitors 48 connected across the positive DC rail 44 and the negative DC rail 46 with the mid-point connection 50 to ground filter the positive and negative DC power as well as establish equal and opposite electrical potential with respect to ground. The DC electrical potential sensor 54 senses the electrical potential across the positive DC rail 44 and the negative DC rail 46 to generate the corresponding DC bus potential signal on the DC bus potential sensor output line 56. A multiphase AC active rectifier input current sensor system 76 senses the levels of AC current drawn by the active rectifier 74 and generates corresponding active rectifier input current signals on an active rectifier input current signal bus 78.

A matrix converter 80 receives the multiphase AC main power on the main stator bus 42 and converts it to the multiphase AC system bus power on the AC system bus 52. A multiphase AC system bus electrical potential sensor system 82 detects the levels of AC potential on the AC system bus 52 and generates corresponding AC system bus potential signals on an AC system bus potential bus 84. A multiphase AC capacitor current system 86 measures the levels of capacitor current through its respective capacitors and generates corresponding capacitor current signals on a capacitor current bus 88. A multiphase AC matrix converter input current sensor system 90 senses the levels of AC current drawn by the matrix converter 80 and generates corresponding matrix converter input current signals on a matrix converter input current signal bus 92.

A multiphase AC main stator bus electrical potential sensor system 96 senses the levels of electrical potential on the main stator bus 42 and generates corresponding main stator potential signals on a main stator potential bus 98. A system control unit 100, powered by the auxiliary power bus 36, generates the H-bridge drive signals on the H-bridge drive signal bus 68 and the H bridge 38 receives the exciter control signal to adjust the level of the exciter current on the exciter bus 40 that corresponds to the exciter control signal. The system control unit 100 controls the operation of the active rectifier 74 by way of an active rectifier control bus 102 and the operation of the matrix converter by way of a matrix converter control bus 104.

The system control unit 100 receives the DC bus potential signal on the DC bus potential sensor output line 56 in the DC bus potential feedback loop 64. The system control unit 100 also receives the exciter current signal on the exciter current sensor output line 60 in the exciter current feedback loop 66.

The system control unit 100 receives the active rectifier input current signals on the active rectifier input current signal bus 78 in an active rectifier input current feedback loop 106. The system control unit 100 receives the matrix converter input current signals on the matrix converter input current signal bus 92 in a matrix converter input current feedback loop 108.

The system control unit 100 receives the capacitor current signals on the capacitor current bus 88 in a capacitor current feedback loop 110. The system control unit 100 also receives the AC system bus potential signals on the AC system bus potential bus 84 in an AC system bus potential feedback loop 112. The system control unit further receives the main stator potential signals on the main stator potential bus 98 in a main stator potential feedback loop 114.

Figure 3:
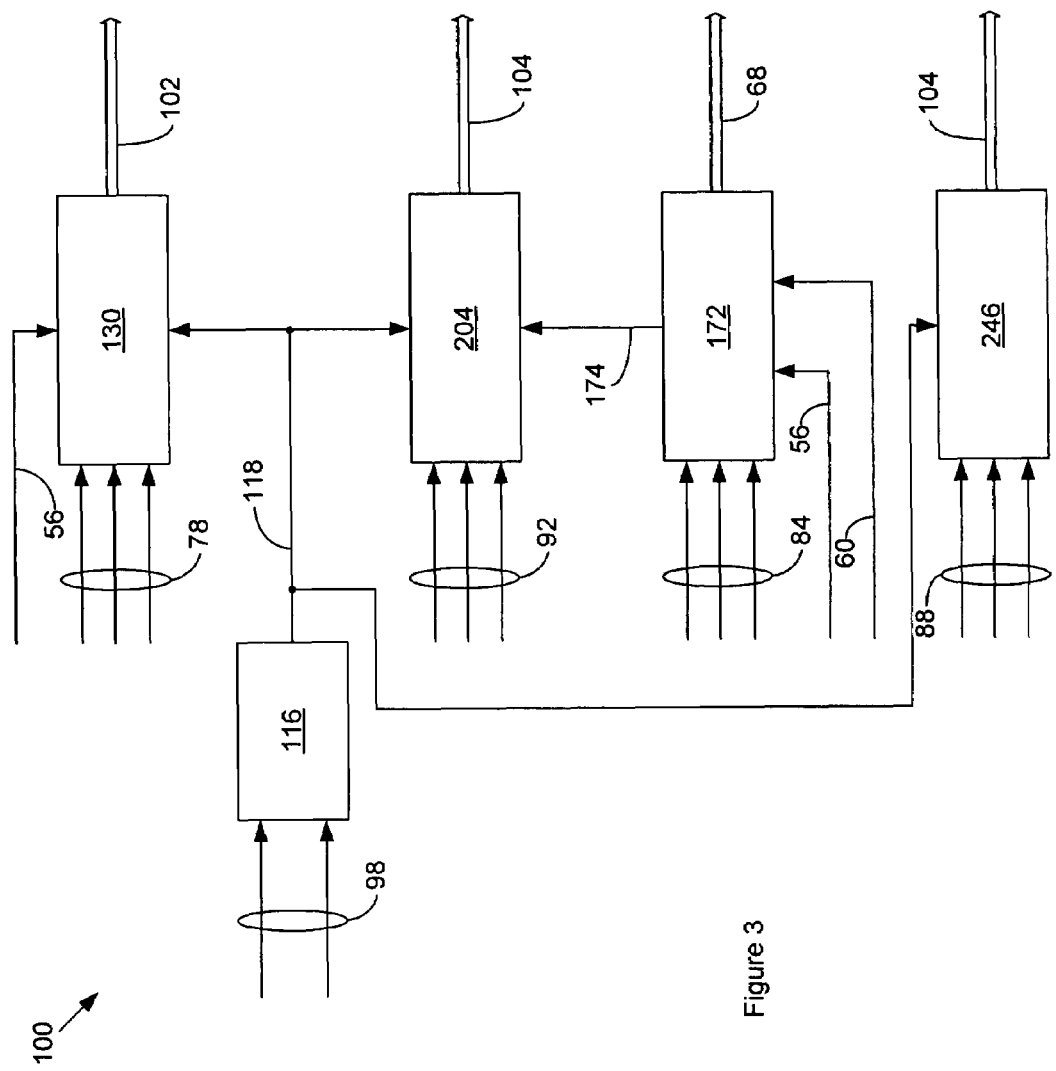
FIG. 3 is a high-level schematic diagram of a system control unit for an electrometrical power transfer system according to a possible embodiment of the invention.

FIG. 3 is a high-level schematic diagram of the system control unit 100. A synchronisation derivation system 116 receives at least two of the main stator potential signals in the main stator potential feedback loop 114 by way of the main stator potential bus 98 to generate an angle synchronisation signal on an angle synchronisation signal line 118. FIG. 4 is a more detailed schematic diagram of the synchronisation derivation system 116. An input filter 120 receives the main stator potential signals on the main stator potential bus 98 and filters out high frequency noise to output filtered main stator potential signals on an input filter output bus 122. A zero-cross detector 124 receives the filtered main stator potential signals on the input filter output bus 122 to generate a corresponding square wave synchronisation signal on a zero-cross detector output line 126. A triangle wave generator 128 receives the square wave synchronisation signal on a zero-cross detector output line 126 to generate the angle synchronisation signal on the angle synchronisation signal line 118.

Referring again to FIG. 3, a DC bus active rectifier controller 130 receives the DC bus potential signal in the DC bus potential feedback loop 64 by way of the DC bus potential sensor output line 56, the active rectifier input current signals in the active rectifier input current feedback loop 106 by way of the active rectifier input current signal bus 78 and the angle synchronisation signal on the angle synchronisation signal line 118 to generate active rectifier gate drive signals on the active rectifier control bus 102. FIG. 5 shows a more detailed schematic of the DC bus active rectifier controller 130. A DC bus potential comparator 132 receives the DC bus potential signal on the DC bus potential sensor output line 56 and a DC bus reference potential signal on a DC bus potential reference line 134 and compares them to generate a DC bus potential error signal on a DC bus potential error signal line 136.

A DC bus potential error signal proportional integral (PI) controller 138 receives the DC bus potential error signal on the DC bus potential error signal line 136 to generate a direct d-axis DC reference current signal on a d-axis DC reference current signal line 140. An active rectifier input current Park's transformation 142 receives the active rectifier input current signals on the active rectifier input current signal bus 78 and the angle synchronisation signal on the angle synchronisation signal line 118 to generate respective direct d-axis and quadrature q-axis active rectifier input current feedback signals on d-axis active rectifier input current feedback line 144 and q-axis active rectifier input current feedback line 146 respectively.

A d-axis active rectifier input current comparator 148 compares the d-axis active rectifier input current feedback signal on the d-axis active rectifier input current feedback line 144 with the DC reference current signal on the d-axis DC reference current signal line 140 to generate a d-axis active rectifier input current error signal on a d-axis active rectifier input current error signal line 150. A q-axis active rectifier input current comparator 152 compares the q-axis active rectifier input current feedback signal on the q-axis active rectifier input current feedback line 146 with a zero-level q-axis DC reference current signal on a q-axis DC reference current signal line 154 to generate a q-axis active rectifier input current error signal on a q-axis active rectifier input current error signal line 156.

A d-axis active rectifier input current error PI controller 158 receives the d-axis active rectifier input current error signal on the d-axis active rectifier input current error signal line 150 to generate a d-axis active rectifier electrical potential signal on a d-axis active rectifier electrical potential signal line 160. A q-axis active rectifier input current error PI controller 162 receives the q-axis active rectifier input current error signal on the q-axis active rectifier input current error signal line 156 to generate a q-axis active rectifier electrical potential signal on a q-axis active rectifier electrical potential signal line 164.

An active rectifier space vector modulator 166 receives the d-axis active rectifier electrical potential signal on the d-axis active rectifier electrical potential signal line 160 and the q-axis active rectifier electrical potential signal on a q-axis active rectifier electrical potential signal line 164 to generate respective active rectifier space vector modulation signals on an active rectifier space vector modulation signal bus 168. An active rectifier gates drive module 170 receives the active rectifier space vector modulation signals on the active rectifier space vector modulation signal bus 168 to generate the active rectifier gate drive signals on the active rectifier control bus 102.

Referring once again to FIG. 3, an exciter stator controller 172 receives the AC system bus potential signals on the AC system bus potential bus 84, the DC bus potential signal on the DC bus potential line 56 and the exciter current signal on the exciter current sensor output line 60 to generate an AC root-mean-square (rms) feedback signal on an AC rms feedback signal line 174 and the H-bridge drive signals on the H-bridge drive signal bus 68. FIG. 6 is a more detailed schematic diagram of the exciter stator controller 172. An AC rms calculator 176 receives the AC system bus potential signals on the AC system bus potential bus 84 to generate the AC rms feedback signal on the AC rms feedback line 174. An amplifier 178 with a desired gain, such as 2.34, receives the AC rms feedback signal on the AC rms feedback line 174 to generate an estimated DC bus potential signal on an estimated DC bus potential signal line 180.

A minimum DC bus potential selector 182 receives the estimated DC bus potential signal on the estimated DC bus potential signal line 180 and the DC bus potential signal on the DC bus potential line 56 and selects the lowest value of these two signals to generate a minimum DC bus potential signal on a minimum DC bus potential signal line 184. A DC bus potential comparator 186 receives the minimum DC bus potential signal on the minimum DC bus potential signal line 184 and a reference DC bus potential signal on a reference DC bus potential signal line 188 and compares them to generate a DC bus potential error signal on a DC bus potential error signal line 190.

A DC bus potential error signal PI controller 192 receives the DC bus potential error signal on a DC bus potential error signal line 190 to generate a respective exciter current reference signal on an exciter current reference signal line 194. An exciter current comparator 196 receives the exciter current feedback signal on the exciter current feedback signal line 60 and the exciter current reference signal on the exciter current reference signal line 194 and compares them to generate an exciter current error signal on an exciter current error signal line 198. An exciter current error signal PI controller 200 receives the exciter current error signal on the exciter current error signal line 198 and generates a corresponding exciter current drive signal on an exciter current drive signal line 202. An exciter current PWM modulator receives the exciter current drive signal on the exciter current drive signal line 202 to generate the H-bridge drive signals on the H-bridge drive signal bus 68.

Referring once again to FIG. 3, a source-side matrix converter controller 204 receives the AC rms feedback signal on the AC rms feedback line 174, the matrix converter input current signals in the matrix converter input current feedback loop 108 by way of the matrix converter input current signal bus 92 and the angle synchronisation signal on the angle synchronisation signal line 118 to generate source-side matrix converter gate drive signals on the matrix converter control bus 104. FIG. 7 shows a more detailed schematic of the source-side matrix converter controller 204. An AC rms potential comparator 206 receives the AC rms feedback signal on the AC rms feedback signal line 174 and an AC rms reference potential signal on an AC rms reference potential signal line 208 and compares them to generate an AC rms potential error signal on an AC rms potential error signal line 210.

An AC rms potential error signal proportional integral (PI) controller 212 receives the AC rms potential error signal on an AC rms potential error signal line 210 to generate a direct d-axis source-side reference current signal on a d-axis source reference current signal line 214. A source-side current Park's transformation 216 receives the matrix converter input current signals on the matrix converter input current signal bus 92 and the angle synchronisation signal on the angle synchronisation signal line 118 to generate respective direct d-axis and quadrature q-axis source side current feedback signals on d-axis source-side current feedback line 218 and q-axis source-side current feedback line 220 respectively.

A d-axis source-side current comparator 222 compares the d-axis source-side current feedback signal on the d-axis source-side current feedback line 218 with the source-side reference current signal on the d-axis source side reference current signal line 214 to generate a d-axis source-side current error signal on a d-axis source side current error signal line 224. A q-axis source-side current comparator 226 compares the q-axis source-side current feedback signal on the q-axis source-side current feedback line 220 with a zero-level q-axis source-side reference current signal on a q-axis source-side reference current signal line 228 to generate a q-axis source-side current error signal on a q-axis source-side current error signal line 230.

A d-axis source-side current error PI controller 232 receives the d-axis source-side current error signal on the d-axis source side current error signal line 224 to generate a d-axis source side electrical potential signal on a d-axis source-side electrical potential signal line 234. A q-axis source-side current error PI controller 236 receives the q-axis source-side current error signal on the q-axis source-side current error signal line 230 to generate a q-axis source-side electrical potential signal on a q-axis source-side electrical potential signal line 238.

A source-side space vector modulator 240 receives the d-axis source-side electrical potential signal on the d-axis source-side electrical potential signal line 234 and the q-axis source side electrical potential signal on the q-axis source-side electrical potential signal line 238 to generate respective source-side space vector modulation signals on a source-side space vector modulation signal bus 242. A source-side gates drive module 244 receives the source-side space vector modulation signals on the source-side space vector modulation signal bus 242 to generate source-side matrix converter gate drive signals on the matrix converter control bus 104.

Referring once again to FIG. 3, a load-side matrix converter controller 246 receives the capacitor current signals in the capacitor current feedback loop 110 by way of the capacitor current bus 88 and the angle synchronisation signal on the angle synchronisation signal line 118 to generate load-side matrix converter gate drive signals on the matrix converter control bus 104. FIG. 8 shows a more detailed schematic of the load-side matrix converter controller 246.

A load-side current Park's transformation 248 receives the receives the AC system bus potential signals on the AC system bus potential bus 84 and the angle synchronisation signal on the angle synchronisation signal line 118 to generate respective direct d-axis and quadrature q-axis load-side current feedback signals on d-axis load-side current feedback line 250 and q-axis load-side current feedback line 252 respectively.

A d-axis load-side current comparator 254 compares the d-axis load-side current feedback signal on the d-axis load-side current feedback line 250 with a zero-level d-axis load-side reference current signal on a d-axis load-side reference current signal line 256 to generate a d-axis load-side current error signal on a d-axis load-side current error signal line 258. A q-axis load-side current comparator 260 compares the q-axis load-side current feedback signal on the q-axis load-side current feedback line 252 with a q-axis load-side reference current signal on a q-axis load-side reference current signal line 262 to generate a q-axis load-side current error signal on a q-axis source-side current error signal line 264.

A d-axis load-side current error PI controller 266 receives the d-axis source-side current error signal on the d-axis load-side current error signal line 258 to generate a d-axis load-side electrical potential signal on a d-axis load-side electrical potential signal line 268. A q-axis load-side current error PI controller 270 receives the q-axis load-side current error signal on the q-axis load-side current error signal line 264 to generate a q-axis load-side electrical potential signal on a q-axis load-side electrical potential signal line 272.

A load-side space vector modulator 274 receives the d-axis load-side electrical potential signal on the d-axis load-side electrical potential signal line 268 and the q-axis load-side electrical potential signal on the q-axis source-side electrical potential signal line 272 to generate respective load-side space vector modulation signals on a load-side space vector modulation signal bus 276. A load-side gates drive module 278 receives the load-side space vector modulation signals on the load-side space vector modulation signal bus 2276 to generate load-side matrix converter gate drive signals on the matrix converter control bus 104.

Figure 9:
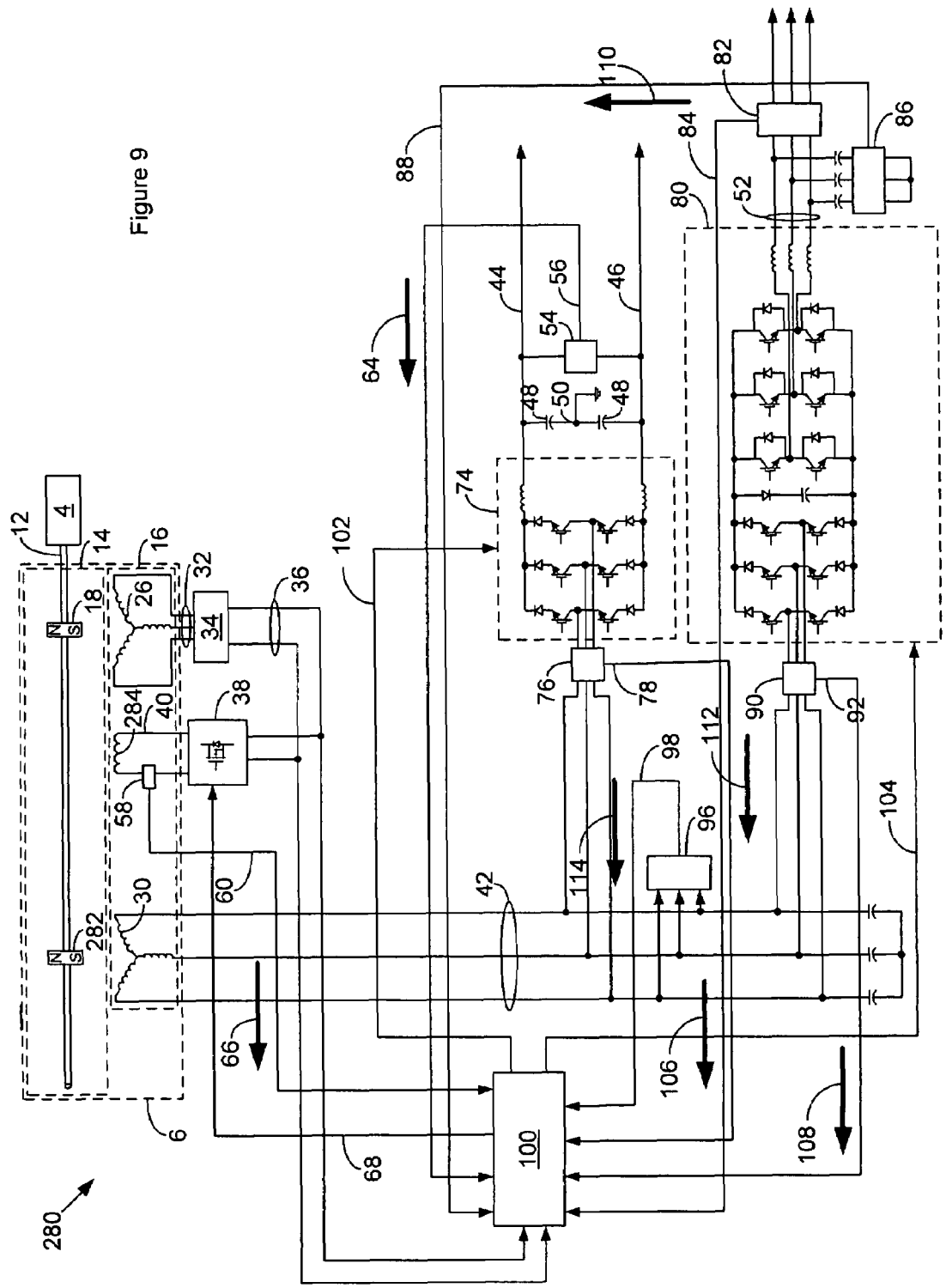
FIG. 9 is high-level schematic diagram of an electromechanical power transfer system according to a possible embodiment of the invention that utilises a dynamoelectric machine of the regulated permanent magnet type.

The dynamoelectric machine 6 may alternatively be of the controllable permanent magnet (PM) type. An example of a suitable construction is found in co-pending applications Ser. Nos. 10/996,411 and 11/420,614, by Dooley, both incorporated herein by reference. FIG. 9 is a high-level schematic diagram of an electromechanical power transfer system 280 according to a possible embodiment of the invention that utilises a dynamoelectric machine of the permanent magnet type. It is much the same as the electromechanical power transfer system 72 hereinbefore described in connection with FIGS. 2 through 8. However, the rotor assembly 14 substitutes a main PM rotor 284 for the main rotor winding 24 and the stator assembly substitutes a PM machine control coil 286 for the exciter stator winding 28. The rotor assembly 14 also lacks the exciter rotor winding 20 and the rotating rectifier assembly 22. With a machine 6 of such construction, the control coil 286 generates a magnetic field with flux that is capable of selectively saturating a portion of a magnetic circuit associated with the main stator winding 30 upon application of electrical current through the control coil 286, thereby varying the reactance of the main stator winding 30. The flux of the control coil field varies the reactance of the main stator winding 30 over a very wide range, thereby permitting control of main stator output current rather than generated electromagnetic force (emf). This design also has an intrinsic magnetic feedback feature that causes the reactance of the machine 6 to remain at a minimum value until the output current attains a specific ratio to the control current, at which point the reactance abruptly increases with output current. This makes the machine 6 behave as a constant current source regardless of electrical load. The incorporated references describe further details of the construction and operation of such a machine 6.

References to the exciter stator winding 28 and exciter current in connection with FIGS. 1 through 8 simply change to the PM control coil 284 for the embodiment shown in FIG. 9. For both the embodiments of FIGS. 2 and 9 then, an electromechanical power transfer system has a dynamoelectric machine with a control winding, either an exciter stator winding or PM control coil, for changing the output of its main stator winding with control coil current regulated by a system control unit.

The described embodiments of the invention are only some illustrative implementations of the invention wherein changes and substitutions of the various parts and arrangement thereof are within the scope of the invention as set forth in the attached claims.

The claimed invention is:

1. An electromechanical power transfer system that transfers power between a prime mover and a combination of multiphase alternating current (AC) and direct current (DC) electrical power systems, comprising:
    a dynamoelectric machine that has a rotor assembly coupled to the prime mover, a main stator with a multiphase alternating current (AC) winding coupled to a main stator bus and a control coil with a winding that varies the output of the main stator with the application of control coil current;
    a matrix converter coupled to the main stator bus for converting AC on the main stator bus to AC of a desired electrical frequency and potential on an AC system bus;
    an active rectifier coupled to the main stator bus for converting AC on the main stator bus to DC of a desired potential on a DC bus; and
    a system control unit for generating the control coil current with a level that regulates the output of the main stator on the main stator bus, controlling the output of the matrix converter to regulate the output of the AC system bus and controlling the output of the active rectifier to regulate the output of the DC bus.

2. The power transfer system of claim 1, further comprising a main stator potential feedback loop that comprises a multiphase AC main stator bus potential sensor system for sensing electrical potentials for at least two phases of the main stator bus and generating corresponding main stator potential signals.

3. The power transfer system of claim 1, further comprising an active rectifier input current loop that comprises a multiphase AC active rectifier input current sensor system for the levels of AC current drawn by the active rectifier and generates corresponding active rectifier input current signals.

4. The power transfer system of claim 1, further comprising a DC bus potential feedback loop that comprises a DC electrical potential sensor for sensing electrical potential on the DC bus and generating a corresponding DC bus potential signal.

5. The power transfer system of claim 1, further comprising a control coil current feedback loop that comprises a control coil current sensor for measuring control coil current that passes through the control coil and generating a control coil output signal that is representative of the level of control coil current.

6. The power transfer system of claim 1, further comprising an AC system bus potential feedback loop that comprises a multiphase AC system bus electrical potential sensor system that senses the levels of AC potential on the AC system bus and generates corresponding AC system bus potential signals.

7. The power transfer system of claim 1, further comprising a matrix converter input current feedback loop that comprises a multiphase AC matrix converter input current sensor system for sensing the levels of AC current drawn by the matrix converter and generates corresponding matrix converter input current signals.

8. The power transfer system of claim 1, wherein the dynamoelectric machine comprises a wound field synchronous machine and the control coil comprises an exciter stator winding.

9. The power transfer system of claim 1, wherein the dynamoelectric machine comprises a controllable permanent magnet machine and the control coil comprises a control coil winding for the permanent magnet machine.

10. An electromechanical power transfer system that transfers power between a prime mover and a combination of multiphase alternating current (AC) and direct current (DC) electrical power systems, comprising:
    a dynamoelectric machine that has a rotor assembly coupled to the prime mover, a main stator with a multiphase alternating current (AC) winding coupled to a main stator bus and a control coil with a winding that varies the output of the main stator with the application of control coil current;
    a matrix converter coupled to the main stator bus for converting AC on the main stator bus to AC of a desired electrical frequency and potential on an AC system bus;
    an active rectifier coupled to the main stator bus for converting AC on the main stator bus to DC of a desired potential on a DC bus;
    a main stator potential feedback loop that comprises a multiphase AC main stator bus potential sensor system for sensing electrical potentials for at least two phases of the main stator bus and generating corresponding main stator potential signals;
    an active rectifier input current loop that comprises a multiphase AC active rectifier input current sensor system for the levels of AC current drawn by the active rectifier and generates corresponding active rectifier input current signals;
    a DC bus potential feedback loop that comprises a DC electrical potential sensor for sensing electrical potential on the DC bus and generating a corresponding DC bus potential signal;
    a control coil current feedback loop that comprises a control coil current sensor for measuring control coil current that passes through the control coil and generating a control coil output signal that is representative of the level of control coil current;
    an AC system bus potential feedback loop that comprises a multiphase AC system bus electrical potential sensor system that senses the levels of AC potential on the AC system bus and generates corresponding AC system bus potential signals;
    a matrix converter input current feedback loop that comprises a multiphase AC matrix converter input current sensor system for sensing the levels of AC current drawn by the matrix converter and generates corresponding matrix converter input current signals; and a system control unit for generating the control coil current with a level that regulates the output of the main stator on the main stator bus, controlling the output of the matrix converter to regulate the output of the AC system bus and controlling the output of the active rectifier to regulate the output of the DC bus;

wherein the system control unit is responsive to the main stator potential feedback loop, the active rectifier input current loop, the DC bus potential feedback loop, the control coil current feedback loop, the AC system bus potential feedback loop and the matrix converter input current feedback loop.

11. The power transfer system of claim 1, wherein the dynamoelectric machine comprises a wound field synchronous machine and the control coil comprises an exciter stator winding.

12. The power transfer system of claim 1, wherein the dynamoelectric machine comprises a controllable permanent magnet machine and the control coil comprises a control coil winding for the permanent magnet machine.

13. A method of transferring power between a prime mover and a combination of multiphase alternating current (AC) and direct current (DC) electrical power systems coupled by a dynamoelectric machine that has a rotor assembly coupled to the prime mover, a stator with a multiphase alternating current (AC) winding coupled to a main stator bus and a control coil with a winding that varies the output of the main stator with the application of control coil current, comprising the steps of:

converting AC on the main stator bus to AC of a desired electrical frequency and potential on an AC system bus;

converting AC on the main stator bus to DC of a desired potential on a DC bus;

generating the control coil current with a level that regulates the output of the PMM stator on the input AC bus;

regulating the output of the DC bus; and regulating the output of the AC system bus.

* * * * *